United States Patent
Ober

(10) Patent No.: US 6,202,104 B1
(45) Date of Patent: Mar. 13, 2001

(54) PROCESSOR HAVING A CLOCK DRIVEN CPU WITH STATIC DESIGN

(75) Inventor: Robert Edmond Ober, San Jose, CA (US)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/124,183

(22) Filed: Jul. 28, 1998

(51) Int. Cl.[7] .............................. G06F 13/00; G06F 1/26
(52) U.S. Cl. ................... 710/18; 710/5; 710/18; 713/320; 713/322
(58) Field of Search .................... 710/22, 260, 264, 710/266, 5, 18; 713/322, 323, 324, 320; 714/34

(56) References Cited

U.S. PATENT DOCUMENTS

| | | | |
|---|---|---|---|
| 5,167,024 | * | 11/1992 | Smith et al. . |
| 5,428,790 | * | 6/1995 | Harper et al. ............... 713/322 |
| 5,442,775 | * | 8/1995 | Whitted, III et al. .......... 713/601 |
| 5,553,236 | * | 9/1996 | Revilla et al. ................ 714/25 |
| 5,560,020 | * | 9/1996 | Nakatani et al. .............. 713/322 |
| 5,592,173 | * | 1/1997 | Lau et al. ................. 342/357.12 |
| 5,754,883 | * | 5/1998 | Lim et al. .................... 710/18 |
| 5,774,701 | * | 6/1998 | Matsui et al. ................ 713/501 |
| 5,848,281 | * | 12/1998 | Smalley et al. .............. 713/322 |
| 5,878,251 | * | 3/1999 | Hagiwara et al. ............ 713/601 |
| 5,894,577 | * | 4/1999 | MacDonald et al. ......... 710/260 |
| 6,016,548 | * | 1/2000 | Nakamura et al. ........... 713/323 |

FOREIGN PATENT DOCUMENTS

| | | |
|---|---|---|
| 0 458 756 A1 | 4/1991 | (EP) . |
| 0 645 690 A1 | 7/1994 | (EP) . |
| 0 676 686 A2 | 3/1995 | (EP) . |
| 0 676 686 A3 | 3/1995 | (EP) . |
| 08211960 | 8/1996 | (JP) . |

\* cited by examiner

*Primary Examiner*—Thomas C. Lee
*Assistant Examiner*—Chun Cao

(57) ABSTRACT

A processor comprises a central processing unit being clock driven and having a static design. A memory is coupled with the central processing unit for storing interrupt routines and data. An interrupt control unit is coupled with said central processing unit for generating interrupt signals. An interrupt execution unit is provided for executing interrupt routines. If no interrupt routine is being executed the central processing unit is stopped from operating.

27 Claims, 6 Drawing Sheets

PROCESSOR HAVING A CLOCK DRIVEN CPU WITH STATIC DESIGN

BACKGROUND OF THE INVENTION

The present invention relates to a peripheral control processor or input/output control processor in particular, for automotive, communications, and consumer product applications. Such a peripheral control processor can be generally a direct memory access controller with improved features. Usually, direct memory access controllers (DMA-controller) provide independent functions in a microprocessor controlled system. These DMA-controllers have limited functions and for advanced functions the main microprocessor in the system is needed. Many operations which are based on the transfer of data require simple or advanced modification of the data to be transferred or often the transfer is conditional and maybe stopped or interrupted upon different conditions. If these advanced criteria become too complex interaction between the DMA-controller and the microprocessor of the system is needed. Thus, the overall speed of the system is decreased or the microprocessor is blocked from executing other tasks. Also, the DMA-controller in such systems is only used in special tasks. For a significant period during the operation of the system it is not needed. Nevertheless, in present systems the DMA-control has to be active during these periods and therefore consumes power unnecessarily.

SUMMARY OF THE INVENTION

Therefore, it is an object of the present invention to provide a peripheral control processor with a minimum of power consumption. A further object of the present invention is to provide such a peripheral control processor with a maximum of functionality.

This object is achieved by a processor comprising a central processing unit which is clock driven and has a static design. It further comprises a memory coupled with said central processing unit for storing interrupt routines and data, an interrupt control unit coupled with said central processing unit for generating interrupt signals, an interrupt execution unit for executing interrupt routines. If no interrupt routine is being executed the central processing unit is stopped from operating. It will be practically in a halt-state not executing any instructions.

In a further embodiment the central processing unit in addition comprises a control output, and the processor arrangement further comprises a controllable clock unit generating a processor clock fed to the central processing unit, whereby the controllable clock unit comprises a clock enable input coupled with the interrupt control unit and a clock disable input coupled with the control output of the central processing unit, whereby the clock unit is disabled if no interrupt routine is executed.

A peripheral control processor according to the present invention is an independent processor and is integrated, for example, on a microcontroller chip. The peripheral control processor according to the present invention assists the central processing unit of a microcontroller in many tasks that are normally done by a direct memory access controller in combination with interrupt service routines of a central processing unit.

In another embodiment a processor comprises a central processing unit being clock driven and at least one control output, a memory coupled with the central processing unit for storing interrupt routines and data, an interrupt control unit coupled with the central processing unit for generating interrupt signals, a controllable clock unit generating at least a first and a second processor clock fed to the central processing unit. The first clock is higher than the second clock. The controllable clock unit comprises a clock control input coupled with the interrupt control unit and with the control output of the central processing unit. The clock unit generates the first clock if any interrupt routine is executed and the second clock if no interrupt routine is executed.

The peripheral control processor according to the present invention is completely interrupt driven. No Kernel is provided. Thus, if no interrupt routine is pending, the processor can deactivate itself by disabling the clock signal or it can slow down its clock signal thereby comprising a decreased power consumption. Upon an interrupt the clock signal will re-established and the processor can execute the respective interrupt program. Such a combination of microcontroller and peripheral control processor can be preferably used in battery operated systems because it avoids unnecessary power consumption.

DESCRIPTION OF THE PREFERRED EMBODIMENT

Figure 1:
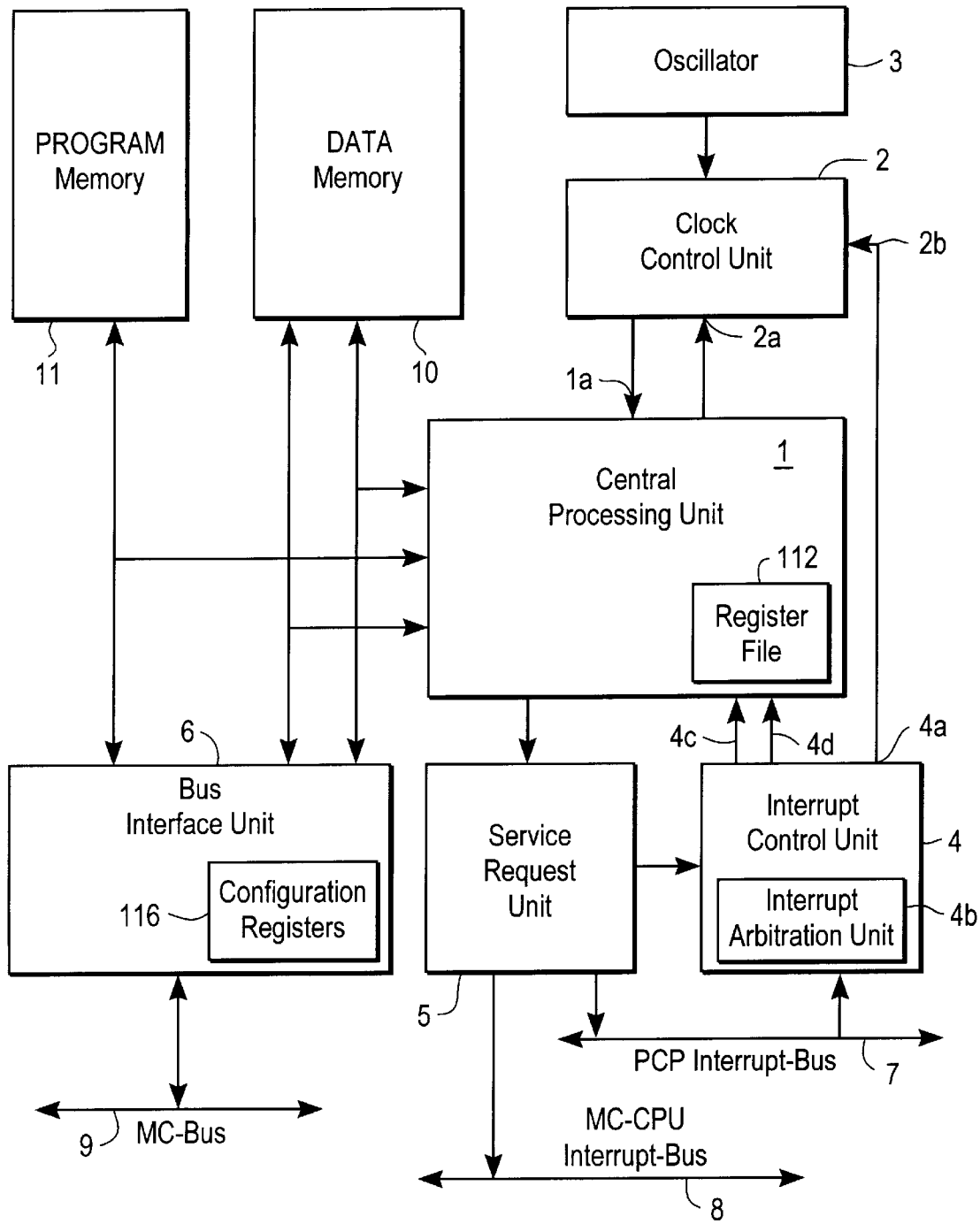
FIG. 1 shows a block diagram of an embodiment of a peripheral control processor according to the present invention.

According to FIG. 1, a peripheral control processor comprises a central processing unit 1 including a register file 112 which is coupled to a program memory 11 and a data memory 10 via respective buses. The central processing unit 1 is clock driven and comprises a complete static design. A clock control unit 2 is coupled with an oscillator 3 and outputs a clock signal which is fed to input 1A of central processing unit 1. Central processing unit 1 generates a control signal which is fed to input 2A of clock control unit 2. A bus interface unit 6 shares the same buses as program memory 11 and data memory 10. On the other hand, bus interface unit 6 is coupled with a bus 9 which connects the peripheral control processor, for example, with a bus system of a microcontroller. Bus interface unit 6 comprises also configuration or special function registers 116 which are accessible by the central processing unit 1 through the internal bus and by an external system through bus 9. Furthermore, a service request unit 5 is provided which generates a service request or an interrupt which is coupled to a microcontroller CPU interrupt bus 8. Service request unit 5 is coupled with central processing unit 1. An interrupt control unit 4 comprises an interrupt arbitration unit 4B which is coupled to a peripheral control processor interrupt bus 7. Bus 7 is also coupled with service request unit 5 which is also coupled with interrupt control unit 4. Interrupt control unit 4 generates an interrupt signal 4C and an interrupt vector 4D which are fed to central processing unit 1. Interrupt control unit 4 can further generate a control signal 4A which is fed to input 2B of clock control unit 2.

The central processing unit 1 contains the instruction sequencer, transfer control unit and the arithmetic logic unit. It operates only interrupt driven. In other words if no interrupt is pending then the central processing unit 1 does not do anything. If an interrupt routine is initiated, then the respective context is loaded from the data memory into the respective registers and a respective routine stored in the program memory 11 is executed. The program memory 11 can be any kind of instruction storage from read only memory, registers, static, random access memory to flash memory. The data memory 10 allows fast loads and storage of the initial general context for each interrupt routine, and the storage of constants, variables, and semaphores. Bus interface unit 6 allows the peripheral control processor to access all microcontroller buses, located peripherals and other resources. The central processing unit 1 also contains a register file 112. Through the microcontroller bus 9 the microcontroller CPU and other bus masters have full access to the program and data memory and to the configuration registers 116 of the peripheral control processor. Parts of the data memory not used by the peripheral control processor programs also might be used as additional global data memory for the microcontroller.

The main feature of the present invention is that the central processing unit of the peripheral control processor does not provide a Kernel. Central processing unit 1 is completely driven by interrupt routines. In other words, if no interrupt routine is executed, then central processing unit 1 usually simply stops. The central processing unit can generate with the last executed command a signal fed to input 2A of control unit 2 which causes clock control unit 2 to stop generating a clock signal fed into input 1A of central processing unit 1. Thus, central processing unit 1 is in a complete halt-state and therefore central processing unit 1 due to its static design does not consume any power. The microcontroller of the system or any other peripheral can request through the peripheral control processor interrupt-bus 7 a new direct memory access. Upon such a request, interrupt arbitration unit 4B generates a interrupt request which is translated into an interrupt vector by interrupt control unit 4. Interrupt control unit 4 generates an enable signal 4A which is fed to input 2B of clock control unit 2. Upon such a signal, clock control unit 2 starts to provide central processing unit 1 with a clock signal through input 1A. At the same time, interrupt control unit 4 provides central processing unit 1 with an interrupt request 4C and an interrupt vector 4D. Then, central processing unit 1 starts executing the respective interrupt program stored in program memory 11.

Figure 9:
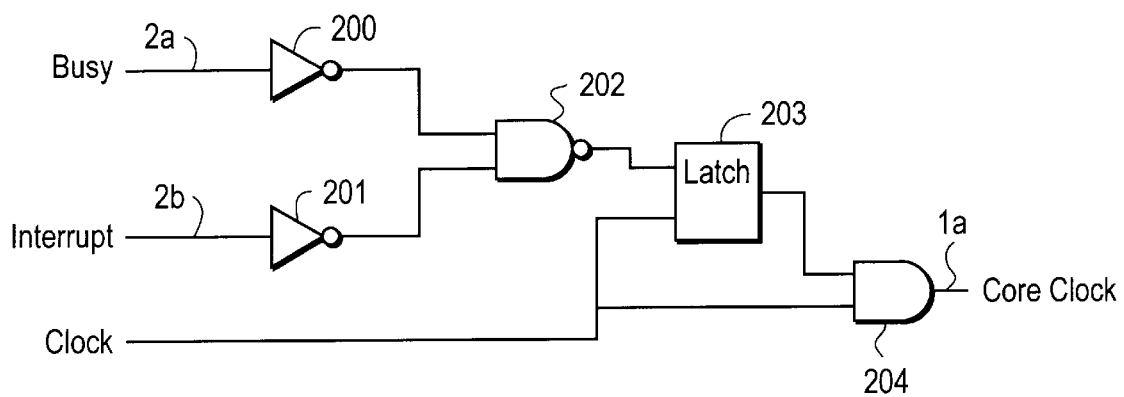
FIG. 9 shows an embodiment of the clock control unit.

FIG. 9 shows a possible embodiment of clock control unit 2. This embodiment allows the safe turning on and off of the clock signal 1a. A Busy signal 2a generated from central processing unit 1 is coupled through an inverter 200 with a first input of a NAND gate 202. The second input of NAND gate 202 is coupled through an inverter 201 with interrupt signal 2b generated by interrupt control unit 4. The output of NAND gate 202 is connected with the input of latch 203. The output of latch 203 is coupled with the first input of an AND gate 204. The first input of AND gate 204 is connected to the output signal of oscillator 3. The clock signal from oscillator 3 triggers with a negative clock level latch 203.

Central processing unit 1 provides the busy signal 2a as long as any interrupt routine is pending. This signal is set to zero when the pipeline has been cleared. Then, the clock control unit 2 does the following: If no interrupt is generated signal 2b is also set to zero. The output of NAND gate 202 turns therefore low. This signal change is latched on the negative clock level of the clock signal by means of the latch 203. The AND gate 204 then blocks the clock signal. The central processing unit is shut off. This allows for a clean halting of the clock in low state, and for a clean startup on the assertion of the interrupt signal 2b. It also allows for the two signals 2a and 2b to come directly from register outputs. As soon as an interrupt occurs and signal 2b is set, the clock is forced on, the core realizes an interrupt is asserted, and begins the appropriate restore. As soon as the last instruction sequence is completed the Busy signal is set to zero again.

The system according to the present invention uses an arbitration unit to determine the priority of requested interrupts. In these scheme every requester including the central processing unit 1 participates. The central processing unit participates with its own priority level or if an interrupt routine is been executed with the respective priority level of that interrupt routine. If many interrupt request are pending, then in each round it is determined which requester has the highest priority. In each round a single or multiple bits of the requesters priority is compared with each other until a single requester remains. Of course, any other arbitration scheme or mechanism can be used to determine the priority of a winning requester.

A general program is usually started when the interrupt arbitration round results in a winning interrupt request and the peripheral control processor is quiescent or the currently executing interrupt service routine allows interrupts and its posted priority number is less than the winning priority number of the interrupt request.

Figure 2A:
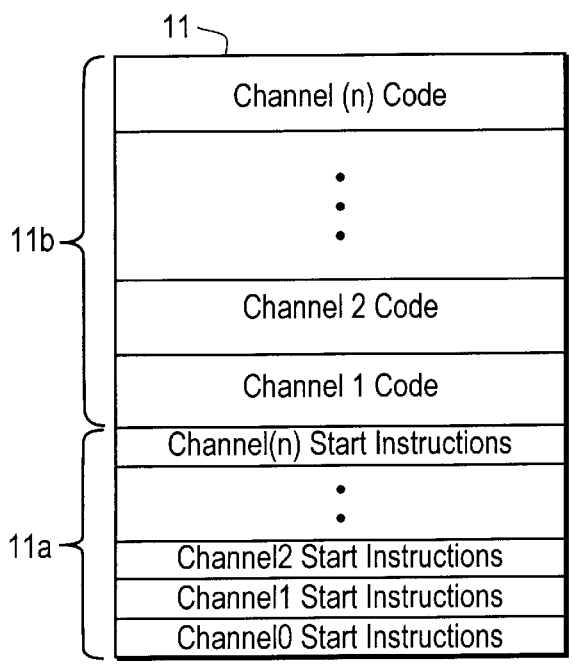
FIG. 2A and FIG. 2B show two different organizations of the code memory.
Figure 2B:
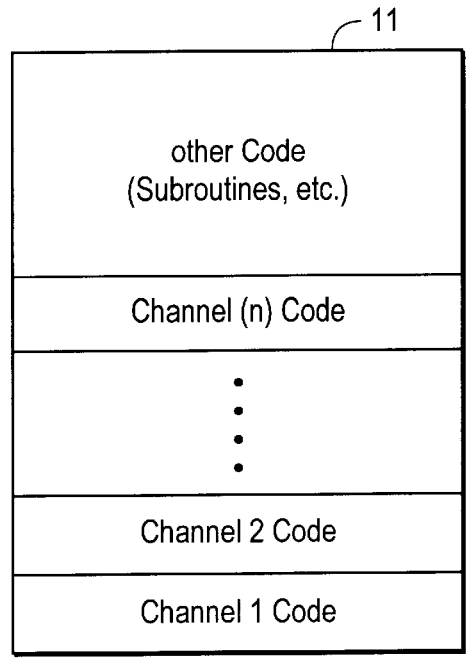

FIGS. 2 and 3 shows organizations of program memory 11 and data memory 10 which are programmable. One of the system registers in the configuration registers 116 defines whether program memory is used as a partitioned memory shown in FIG. 2A or a non-partitioned memory shown in FIG. 2B. The partitioned memory shown in FIG. 2A divides memory 11 in two blocks 11A and 11B. The first block 11A of memory 11 is the general entry code table consisting of two instruction slots, for example, two 16-bit words, for each channel implemented, and the second block 11B is the main code block. It is assumed that the program memory 11 is organized as a 32-bit memory and each consecutive address of memory block 11A defines a base address for a respective channel. When the peripheral control processor is operated so that each channel always starts at its base address, the program counter is determined by a simple equation based on the channel number. If more than two instruction slots are required for the channel, then one of the instructions must be a branch or jump instruction to the rest of the channels code which is located in the second block 11B. Because of this packing, it is best to use consecutive channel numbers beginning at number 1. The channel entry table address for a specific channel is on the microcontroller bus 9: code base address +04H×channel number, and on the internal bus defined by the program counter of CPU 1: 02H×channel number.

Bus interface 6 also allows to execute code which is stored in a memory connected to microcontroller bus 9. Therefore, bus interface unit 6 translates the program counter fetch into the respective microcontroller bus address 9.

The code memory does not have to be partitioned, as shown in FIG. 2B. If the respective control register in the configuration registers 116 indicates that a non-partitioned memory is used, then each channel program starts at a specific start program counter which is stored in the data memory 10. The user must ensure that data memory 10 is programmed properly to define all entry addresses for each channel program.

Figure 3A:
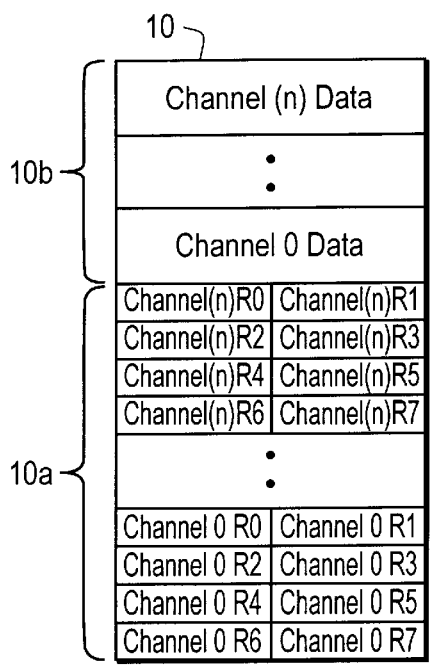
FIG. 3A, FIG. 3B, and FIG. 3C show three different organizations of the data memory.
Figure 3B:
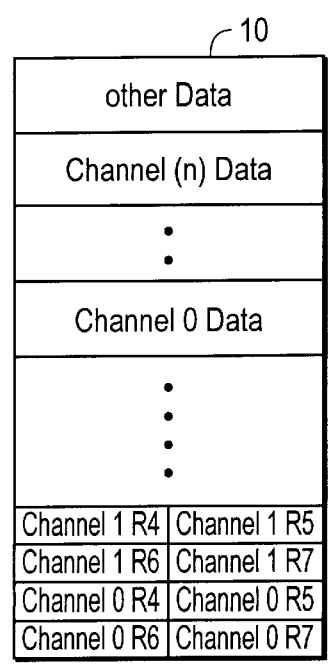
Figure 3C:
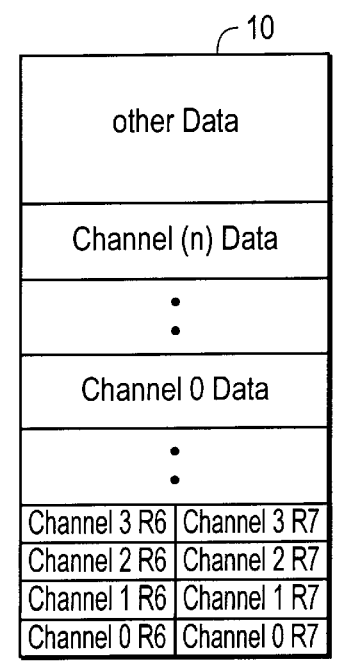

FIG. 3 shows three different kinds of programmable data memory organizations. FIG. 3A shows the so-called full context organization. It is assumed, that register file 112 contains at least eight general purpose registers. Data memory 10 is divided into two major areas, the general context safe area and the general specific parameter blocks. In FIG. 3A, the first block represents the content of all general purpose registers of each channel in memory block 10A. FIG. 3B shows an organization which uses only the upper four registers of each channel in memory block 10A. This organization allows to store other data in data memory 10. FIG. 3C shows a minimum context, whereby only two registers of each channel context are stored in memory block 10A. This organization allows even more data to be stored in data memory 10. The register file 112 of the peripheral control processor in this embodiment comprises eight general purpose registers with instructions explicit and some implicit uses. These registers are all accessible by peripheral control processor programs directly. Of the eight registers, register R7 is the only one which may not be used as a general purpose register. This register R7 contains the data pointer and status register bits. All eight registers are generally used as described in Table 1.

TABLE 1

| Reg. | Implicit Use | Description |
| --- | --- | --- |
| R0 | Accumulator | Implicit target for most arithmetic and logical instructions |
| R1 | | 32 Bit general purpose register |
| R2 | Return Addr. | 32 Bit general purpose register |
| R3 | | 32 Bit general purpose register |
| R4 | Source | Source Pointer for Copy instruction |
| R5 | Destination | Destination pointer for Copy instruction |
| R6 | transfer functions | different transfer functions, like count, service type, current priority |
| R7 | DPTR/Flags | Data Pointer (DTPR) and status flags |

The contents of R0 to R7 constitute the full context of a channel. A small context is constituted by registers R4 to R7 and allows for correct operation of direct memory access channels, as well as channels which are not sensitive to saving of large amounts of data between channel invocation. A minimum context allows for R6 to R7 to be saved and restored.

The channel data according to FIGS. 3A–3C provide additional parameter for each channel which can be accessed during execution of the respective channel interrupt routine. Because every channel has its own data pointer DPTR, for example, R7 in this embodiment, all combinations from separate to overlapping parameter blocks are possible. Normally, data memory 10 accesses are relative to the base address 0 of the data memory 10. The locations of general parameters in memory are arbitrary. the parameters may have no particular relationship to a channel number. Again, if data memory 10 accesses are being completed via the external MC-bus 9, the data memory access is translated into an internal bus address by the bus interface unit 6.

A special function register in the configuration registers 116 indicates which kind of context, minimum, small, or full will be used. A full context provides the most flexibility whereas a minimum context provides a faster context switch and may also provide more channels being available depending on the size of the data memory 10. This scheme provides through its programmability a very flexible system which can be programmed in a wide variety meeting the demands of the respective task.

Figure 4:
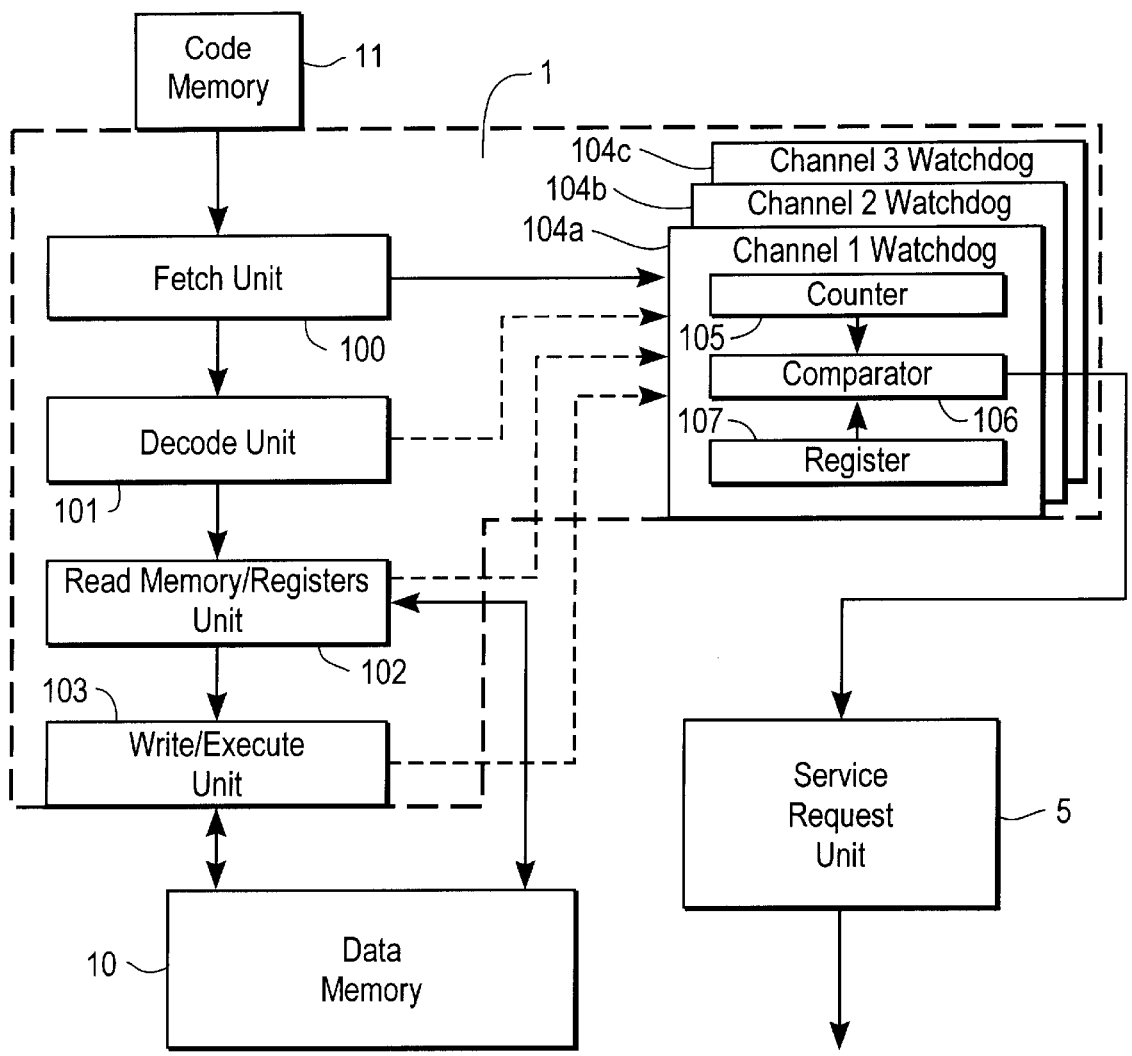
FIG. 4 shows the central processing unit having a first watchdog feature.

To prevent any error in execution flow of a channel program, a general watchdog feature can be provided as shown in FIG. 4. FIG. 4 shows a simplified central processing unit comprising a simple pipeline with a fetch unit coupled with code memory 11, a decode unit 101 coupled with fetch unit 100, a read memory/registers unit 102 coupled with decode unit 101, and a write execute unit 103 which is coupled with data memory 10. Read memory/registers unit 102 is also coupled with data memory 10. For a better overview, all other elements of central processing unit 1 are not shown in FIG. 4. Each channel comprises a watchdog unit 104a, 104b, 104c . . . having a counter 105, a comparator 106, and a register 107.

In a different embodiment only one register 107 and comparator 106 can be provided for all channels. The comparator switches through the different channel counters. In yet another embodiment only one channel watchdog 104a is used. In this embodiment the counter is reset every time a channel program switches.

Counter 105 may be coupled with one of the pipeline units or may be coupled with the program counter. Comparator 106 in the watchdog unit 104a, and if implemented the comparators 104b, 104c . . . is/are coupled with service request unit 5 which can generate a service request on micro controller interrupt bus 8.

The purpose of counter 105 is to count the number of instructions executed during a specific channel program. Therefore, comparator 106 compares a predetermined value stored in register 107 with the content of counter 105. Counter 105 can be triggered by any stage of the pipeline or by the program counter as indicated in FIG. 4. If counter 105 reaches or exceeds the value stored in register 107, comparator 106 generates a signal which is fed to service request unit 5. Service request unit 5 generates an interrupt which is fed to the microcontroller central processing unit via microcontroller interrupt bus 8 or to the central processing unit 1 through interrupt control unit 4. Depending on the programming of the system either the microcontroller (not shown) or the central processing unit 1 serve the interrupt. If such a request is generated it is assumed that the central processing unit 1 is not working properly anymore. The request can therefore reset the central programming unit. If the request is fed to the microcontroller, it can either reset the central processing unit or execute a respective correction routine to ensure proper program execution of the central processing unit 1.

Figure 5:
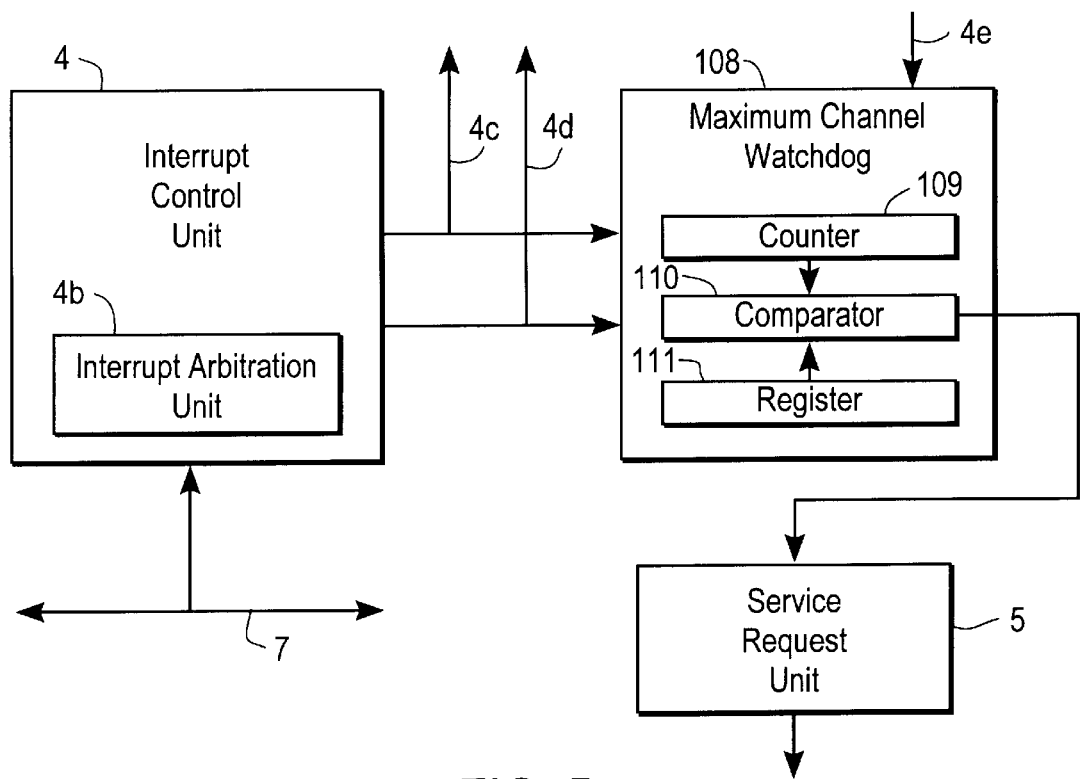
FIG. 5 shows a further embodiment having a second watchdog feature.

FIG. 5 shows another feature of a watchdog controlling the maximum number of channels. Interrupt control unit 4 generates an interrupt request 4C and an interrupt vector 4D which are fed to a maximum channel watchdog unit 108. Maximum channel watchdog unit 108 comprises a counter 109 which is connected to a comparator 110. Further, a register 111 is provided which is connected to comparator 110. Comparator 110 generates a signal which is fed to service request unit 5.

Whenever interrupt control unit 4 generates a specific interrupt vector 4D which has not been generated before, counter 109 is increased. In other words, whenever a new channel program for direct memory access is started, counter 109 is increased. Thus, counter 109 counts the number of channels which are used. Comparator 110 compares the value of counter 109 with a predetermined value stored in register 111. Whenever counter 109 reaches or exceeds the value of register 111, comparator 110 generates a signal which is fed to service request unit 5. Thus, an interrupt request is generated whenever the maximum channel number is exceeded which has been set in register 111, and such a routine is started within the microcontroller central processing unit. This watchdog function is useful if it is known how many channels are used in an application. If the number exceeds this predetermined value, then there must be a functional error in the program execution. In a variation maximum channel watchdog 108 receives in addition a signal 4e from central processing unit 1 which indicates whenever a channel routine is finished. If such a signal is fed to watchdog 108 counter 109 will be decremented. Every time an interrupt signal 4c, 4d is generated counter 109 is incremented. Thus the value in counter 109 indicates the number of channels executed in parallel in central processing unit 1. The register 111 can store a maximum value of channels which can be processed in parallel. If the number exceeds this maximum value the central processing unit might get overloaded and not be able to process the requested task. Therefore, comparator 110 generates a signal if the counter value exceeds the value stored in register 111. This signal is fed to service request unit 5 which generates a service request which is handled as described above.

Instead of counting the number of interrupts comparator 110 can also compare the actual interrupt number provided in the interrupt vector with the number of implemented channel routines. If the number is higher than the number of implemented channels unit 108 generates a signal which is fed to service request unit 5. In this embodiment counter 109 can be omitted.

Figure 6:
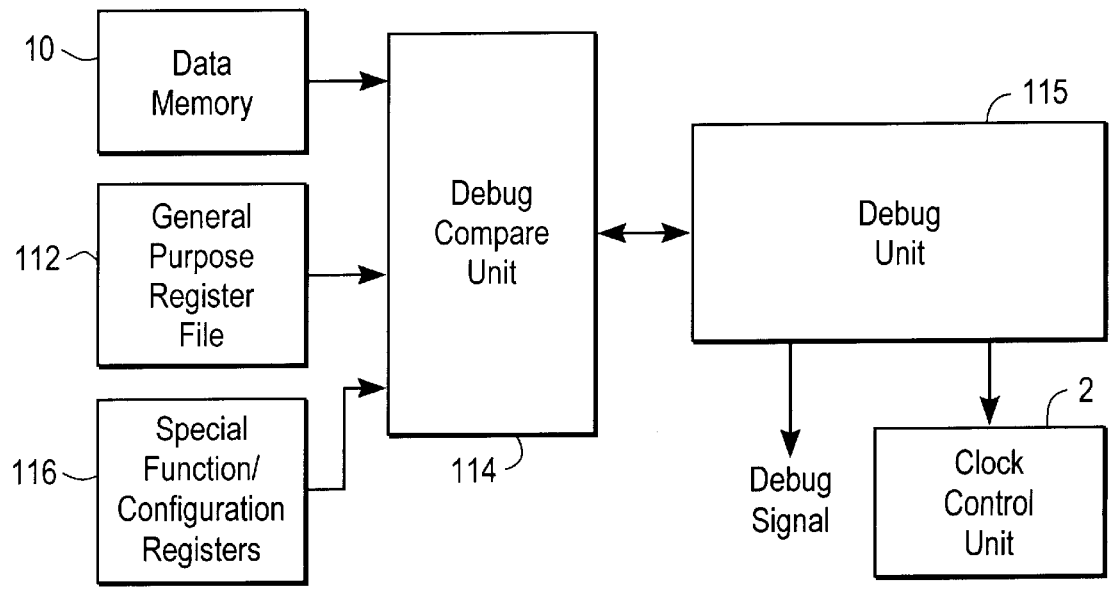
FIG. 6 shows a debug unit in combination with a peripheral control processor.

FIG. 6 shows an embodiment comprising a debug feature. In this embodiment, the peripheral control processor comprises a debug compare unit 114 which is connected to data memory 10, general purpose register file 112 and special function registers 116. Debug compare unit 114 comprises a plurality of registers and comparators which can compare the content of a predefined data memory cell, a general purpose register, or a special function register. If one of the conditions defined in debug compare unit 114 is met, debug compare unit 114 generates a signal which is fed to debug unit 115. Then, debug unit 115 generates a debug signal or generates a signal fed to clock control unit 2 upon which central processing unit 1 is stopped by disabling the control clock. The microcontroller can then check the respective values of the register file 112 and/or special function registers 116 and the data memory 10 through microcontroller bus 9.

Figure 7:
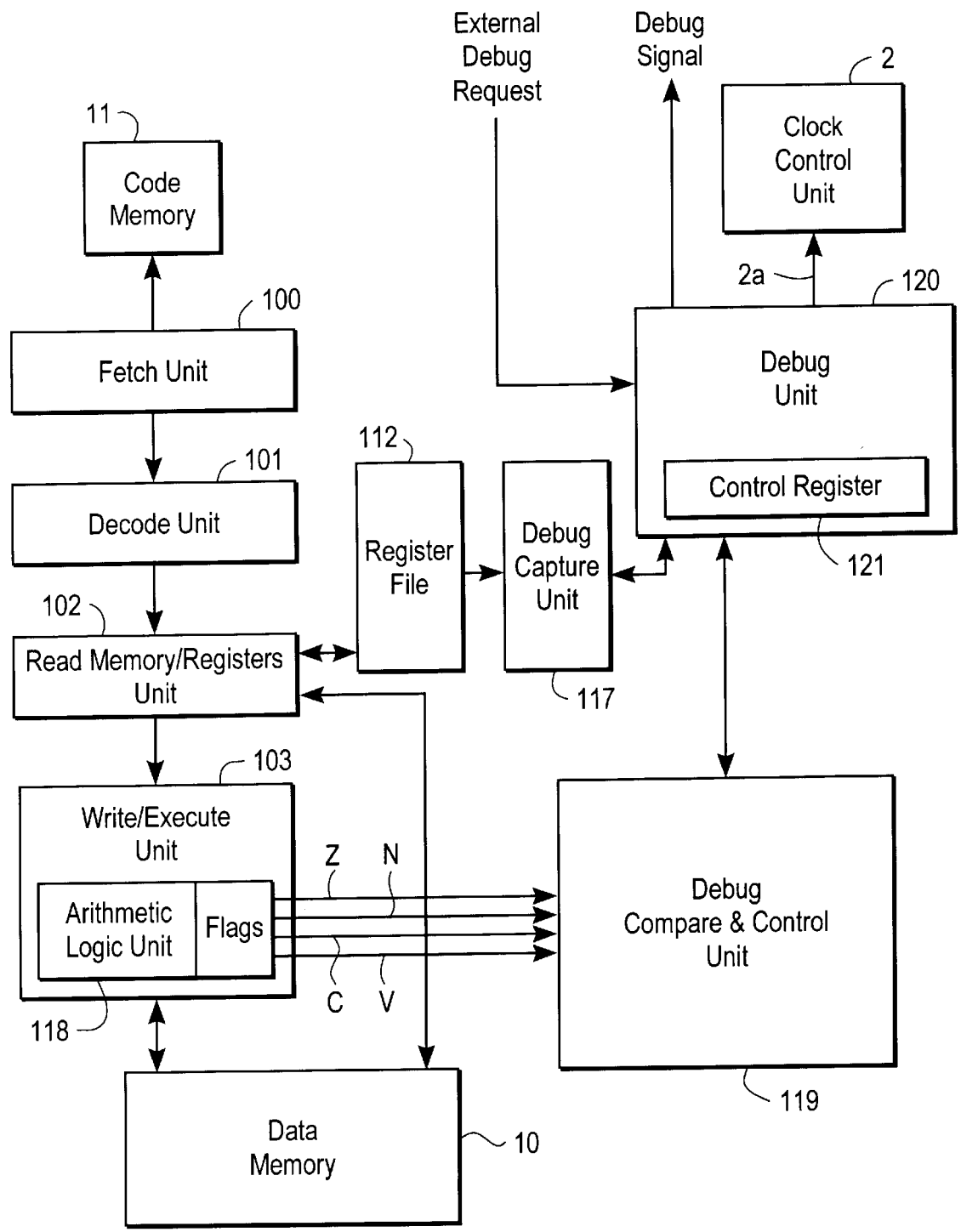
FIG. 7 shows a second embodiment of a peripheral control processor having a debug control unit.

FIG. 7 shows a further embodiment comprising another debug feature. Code memory 11 is coupled with a pipeline having a fetch unit 100, a decode unit 101, a read memory/register unit 102 and a write execute unit 103. Write execute unit 103 comprises a arithmetic logic unit 118 capable of generating flags. In this embodiment four flags are generated by arithmetic logic unit 118. Flag C defines a zero or equal condition, flag N comprises a negative condition, flag C comprises a carry bit condition, and flag V comprises an overflow condition. Read memory register unit 102 is also coupled to data memory 10 and register file 1 12. Write execute unit 103 is also coupled to data memory 10. A debug compare and control unit 119 is provided which receives the flag signals from arithmetic logic unit 118. Debug compare and control unit 119 is also coupled with debug unit 120. Debug unit 120 comprises at least one control register 121 to define a variety of debug features. A debug capture unit 117 is provided which is coupled with register file 112 and with debug unit 120. Debug unit 120 comprises an input for an external debug request and an output for a debug signal. Further, debug unit 120 is coupled with clock control unit 2 via input 2A.

Debug unit 120 can be programmed in a variety of ways. In a first mode, debug unit 120 generates a debug signal or controls clock control unit 2 if debug compare and control unit 119 detects that a predefined condition defined by flag signals C, N, V, and Z is established. If the arithmetic logic unit 118 generates one of these conditions, debug unit 120 generates the respective debug signal or controls clock control unit 2. Debug compare and control unit comprises a comparator which compares the status of the flags C, N, V, Z with a predefined set of conditions. If debug unit 120 is programmed to generate a debug signal, then execution of the respective interrupt routine in the central processing unit 1 is not stopped. The microcontroller receives the debug signal and executes a respective debug routine. The debug signal can also be provided externally for an emulator. This function can also be used for other purposes than a debug function. If the clock control unit 2 is controlled by debug unit 120, then upon a debug event the operation of central processing unit 1 is completely stopped. In addition a debug signal can be generated and fed to the microcontroller. In this mode, the microcontroller can then examine the contents of register file 112 and the memories 10, 11 through microcontroller bus 9. Thus, an efficient debug mode can be established.

In a second mode, debug unit 120 captures the contents of register file 112 upon a debug condition. The debug signal can be generated upon an internal condition defined by the flag signals of arithmetic logic unit 118 as described above or it can be requested by an external debug request signal. In this mode execution of a interrupt routine in the central processing unit 1 is not interrupted and the content of some or all registers in the register file 112 is captured in the instance the debug event occurs. In different embodiments different information can be captured, for example, status flags, special function registers, memory cell contents. Debug capture unit can be preferably located in the bus interface unit to be accessible through microcontroller bus 9. This mode is especially useful for real time debugging.

Figure 8:
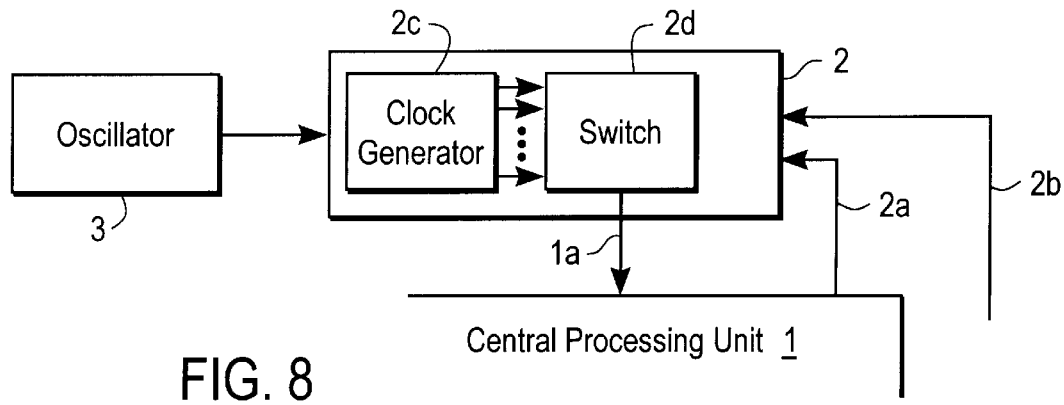
FIG. 8 shows a further embodiment of a clock control unit according to the present invention.

FIG. 8 shows a modification of the clock control unit 2. Clock control unit 2 is capable of generating a variety of different clock signals. Therefore, clock control unit 2 comprises a clock generator 2c which generates different clock signals having different clock rates. At least two clock signals are provided, one having a normal or high clock rate and a second clock signal having a lower clock rate. In addition any clock rate in-between a highest and lowest clock rate can be generated as is indicated by the dotted line. Instead of stopping the processor from executing any instruction a lower clock rate can be supplied to the central processing unit through switch 2d. Switch 2d is controlled through signals 2a and 2b as described above. The processor in this embodiment does not have to be completely static in its design but preferably is. It also can have a kernel executing a basic management program. This embodiment can be combined with the first embodiment allowing control of execution speed of the peripheral processor arrangement from normal operation to any kind of slower operation to a complete stop of operation. Thus, different kind of power consumption levels can be achieved.

What is claimed is:

1. Processor comprising a central processing unit having a control output, being clock driven and having a static design, a controllable clock unit generating a processor clock fed to said central processing unit having a clock disable input coupled with said control output of said central processing unit, a memory coupled with said central processing unit for storing interrupt routines and data, an interrupt control unit coupled with said central processing unit for generating interrupt signals, an interrupt execution unit for executing interrupt routines, whereby if no interrupt routine is being executed said clock unit is disabled and the central processing unit is stopped from operating.

2. Processor according to claim 1 wherein said controllable clock unit comprises a clock enable input coupled with said interrupt control unit.

3. Processor according to claim 2, wherein said memory comprises two separate memory blocks, one for storing program code and one for storing data.

4. Processor according to claim 2, wherein said interrupt control unit comprises an interrupt arbitration unit for prioritizing interrupts.

5. Processor according to claim 4, wherein said interrupt unit generates an interrupt signal and an interrupt vector fed to said central processing unit.

6. Processor according to claim 2, wherein said processor provides direct memory access and comprises an exception unit generating an exception signal, whereby interrupt signals are associated to respective channels of a direct memory access.

7. Processor according to claim 6, wherein said exception unit generates an exception signal upon exceeding a programmable number of direct memory address channels.

8. Processor according to claim 6, wherein said exception unit generates an exception signal upon exceeding a programmable number of direct memory address channels executed in parallel.

9. Processor according to claim 2, wherein said central processing unit comprises an instruction execution count unit and an exception unit generating an exception signal upon exceeding a programmable number of instructions executed during one interrupt routine.

10. Processor according to claim 2, wherein said central processing unit comprises a mode control register associated to an interrupt routine which controls execution of said interrupt routine, whereby said mode control register defines whether said interrupt routine starts at a predetermined address or at a programmable address.

11. Processor according to claim 2, wherein said central processing unit comprises a programmable debug compare unit comprising a control register.

12. Processor according to claim 11, wherein said programmable debug compare unit disables said clock control unit upon a predefined condition.

13. Processor according to claim 11, wherein said programmable debug compare unit generates a debug signal.

14. Processor according to claim 11, wherein said programmable debug compare unit captures status information of said central processing unit.

15. Processor comprising a central processing unit being clock driven and at least one control output a memory coupled with said central processing unit for storing interrupt routines and data, an interrupt control unit couples with said central processing unit for generating interrupt signals, controllable clock unit generating at least a first and a second processor clock fed to said central processing unit, said first clock being higher than said second clock, whereby said controllable clock unit comprises a clock control input coupled with said interrupt control unit and with said control output of said central processing unit, whereby said clock unit generates said first clock if any interrupt routine is executed and said second clock if no interrupt routine is executed whereby if no interrupt routine is being executed the central processing unit is stopped from operating.

16. Processor according to claim 15, wherein said memory comprises two separate memory blocks, one for storing program code and one for storing data.

17. Processor according to claim 15, wherein said interrupt control unit comprises a interrupt arbitration unit for prioritizing interrupts.

18. Processor according to claim 17, wherein said interrupt unit generates an interrupt signal and an interrupt vector fed to said central processing unit.

19. Processor according to claim 15, wherein said processor provides direct memory access and comprises an exception unit generating an exception signal, whereby interrupt signals are associated to respective channels of a direct memory access.

20. Processor according to claim 19, wherein said exception unit comprises a comparator generating an exception signal upon exceeding a programmable number of direct memory address channels.

21. Processor according to claim 19, wherein said exception unit comprises a comparator generating an exception signal upon exceeding a programmable number of direct memory address channels being executed at the same time.

22. Processor according to claim 15, wherein said central processing unit comprises an instruction execution count unit and an exception unit generating an exception signal upon exceeding a programmable number of instructions executed during one interrupt routine.

23. Processor according to claim 15, wherein said central processing unit comprises a mode control register associated to an interrupt routine which controls execution of said interrupt routine, whereby said mode control register defines whether said interrupt routine starts at a predetermined address or at a programmable address.

24. Processor according to claim 15, wherein said central processing unit comprises a programmable debug compare unit comprising a control register.

25. Processor according to claim 24, wherein said programmable debug compare unit disables said clock control unit upon a predefined condition.

26. Processor according to claim 24, wherein said programmable debug compare unit generates a debug signal.

27. Processor according to claim 24, wherein said programmable debug compare unit captures status information of said central processing unit.

* * * * *